US011513620B2

(12) United States Patent
Wu (10) Patent No.: US 11,513,620 B2
(45) Date of Patent: Nov. 29, 2022

(54) DISPLAY HEIGHT ADJUSTING DEVICE AND METHOD FOR ADJUSTING DISPLAY HEIGHT

(71) Applicant: ViewSonic International Corporation, New Taipei (TW)

(72) Inventor: Shu-Kai Wu, New Taipei (TW)

(73) Assignee: ViewSonic International Corporation, New Taipei (TW)

( * ) Notice: Subject to any disclaimer, the term of this patent is extended or adjusted under 35 U.S.C. 154(b) by 0 days.

(21) Appl. No.: 17/537,484

(22) Filed: Nov. 30, 2021

(65) Prior Publication Data

US 2022/0171478 A1    Jun. 2, 2022

(30) Foreign Application Priority Data

Nov. 30, 2020   (TW) ................................ 109142077

(51) Int. Cl.
*G06F 3/041*       (2006.01)
*G06T 7/70*        (2017.01)
*G06V 40/19*       (2022.01)
*G06V 40/10*       (2022.01)

(52) U.S. Cl.
CPC ................ *G06F 3/041* (2013.01); *G06T 7/70* (2017.01); *G06V 40/103* (2022.01); *G06V 40/19* (2022.01); *G06F 2203/04105* (2013.01)

(58) Field of Classification Search
CPC ........... G06F 3/041; G06F 2203/04105; G06F 1/1601; G06T 7/70; G06V 40/103; G06V 40/19; F16M 11/00
See application file for complete search history.

(56) References Cited

U.S. PATENT DOCUMENTS

| | | | |
|---|---|---|---|
| 9,794,516 B1 * | 10/2017 | Tuli ................. | H04N 21/42204 |
| 10,636,158 B1 * | 4/2020 | Kamiyama ............... | G06T 7/50 |
| 2004/0117067 A1 * | 6/2004 | Jouppi ..................... | G06F 3/011 |
| | | | 700/259 |
| 2004/0179714 A1 * | 9/2004 | Jouppi ..................... | H04N 7/15 |
| | | | 348/E7.083 |
| 2015/0332090 A1 * | 11/2015 | Kumamoto .......... | G06V 10/993 |
| | | | 348/222.1 |

FOREIGN PATENT DOCUMENTS

| | | |
|---|---|---|
| CN | 105117023 | 12/2015 |
| CN | 209218260 | 8/2019 |
| CN | 211232225 | 8/2020 |
| CN | 111724758 | 9/2020 |

* cited by examiner

*Primary Examiner* — David D Davis
(74) *Attorney, Agent, or Firm* — JCIPRNET (57) ABSTRACT

A method to adjust the height of a display is provided. One terminal of the telescopic trolley is connected to a first surface of the display and is separated from the lower edge of the display by a first distance. The lower edge of the display is away from the ground by a second distance. The method includes: obtaining a first height value indicating a user's height, an eye height or a shoulder height, searching for a second height value corresponding to the first height value in the look-up table according to the first height value, calculating the sum of the first distance and the second distance, comparing the sum with the second height value to obtain a comparison result, and adjusting the length of the telescopic trolley according to the comparison result, so that the sum is equal to the second height value.

18 Claims, 6 Drawing Sheets

DISPLAY HEIGHT ADJUSTING DEVICE AND METHOD FOR ADJUSTING DISPLAY HEIGHT

CROSS-REFERENCE TO RELATED APPLICATION

This application claims the priority benefit of Taiwan application no. 109142077, filed on Nov. 30, 2020. The entirety of the above-mentioned patent application is hereby incorporated by reference herein and made a part of this specification.

BACKGROUND

Field of the Disclosure

The disclosure relates to a display height adjusting device, and more particularly to a device that adjusts the display height according to a height, an eye height or a shoulder height of the user.

Description of Related Art

Large touch displays (for example, larger than 55 inches) are often adopted in teaching and conferences. A large movable touch display is typically combined with a movable trolley. Through the mobile trolley, the large touch display can be moved to a spot and set up at a certain height for the attendees to watch. In addition, the length of the movable trolley can be adjusted manually or electrically to change the distance between the display and the ground (that is, the height of the display). However, most users are not able to quickly and accurately adjust the display to a suitable height, and need to adjust the display repeatedly. For users on wheelchair and children, it is even more difficult and inconvenient to adjust the display to a suitable height.

Therefore, it is necessary to provide a technical solution that enables various users to quickly and accurately adjust the display to a height suitable for the user.

SUMMARY OF THE DISCLOSURE

The disclosure provides a display height adjusting device, which can quickly and accurately adjust the display to a height suitable for the user.

The disclosure provides a method for adjusting the height of a display, which is applicable for a display supported by a telescopic trolley. One end of the telescopic trolley is joined to the first surface of the display and is separated from the lower edge of the display by a first distance. The lower edge of the display is away from the ground by a second distance. The method includes: obtaining a first height value indicating a height, an eye height, or a shoulder height of a user, searching for a second height value corresponding to the first height value in the look-up table according to the first height value, calculating the sum of the first distance and the second distance, comparing the sum with the second height value to obtain a comparison result, and adjusting the length of the telescopic trolley according to the comparison result, so that the sum is equal to the second height value.

The disclosure provides a computer-readable recording medium storing a computer program, and the computer program is loaded into the computer and executed to complete the method for adjusting the height of the display as described above.

The disclosure provides a computer program product that is loaded into a computer and executed to complete the method of adjusting the height of the display as described above.

The disclosure provides a display height adjusting device. The display is supported by a telescopic trolley. One end of the telescopic trolley is joined to the first surface of the display and is separated from the lower edge of the display by a first distance. The lower edge of the display is away from the ground by a second distance. The display height adjusting device includes an operation circuit, a motor and a microcontroller. The operation circuit is configured for receiving a first height value indicating a height, an eye height or a shoulder height of the user, and searching for a second height value corresponding to the first height value in the look-up table according to the first height value. The operation circuit is configured to calculate the sum of the first distance and the second distance, and compare the sum with the second height value to obtain the comparison result. The motor is coupled to the telescopic trolley for adjusting the length of the telescopic trolley according to the control signal, so that the sum is equal to the second height value. The microcontroller is coupled to the motor to generate a control signal according to the comparison result.

Based on the above, the disclosure can automatically adjust the height of the telescopic trolley according to the first height value (user's height, eye height, or shoulder height). In this way, all kinds of users can quickly and accurately adjust the display to a suitable height, avoiding the inconvenience caused by repeated adjustments, and reducing the discomfort caused by the display height being too high or too low, thereby providing users with a good user experience.

DESCRIPTION OF EMBODIMENTS

Figure 1:
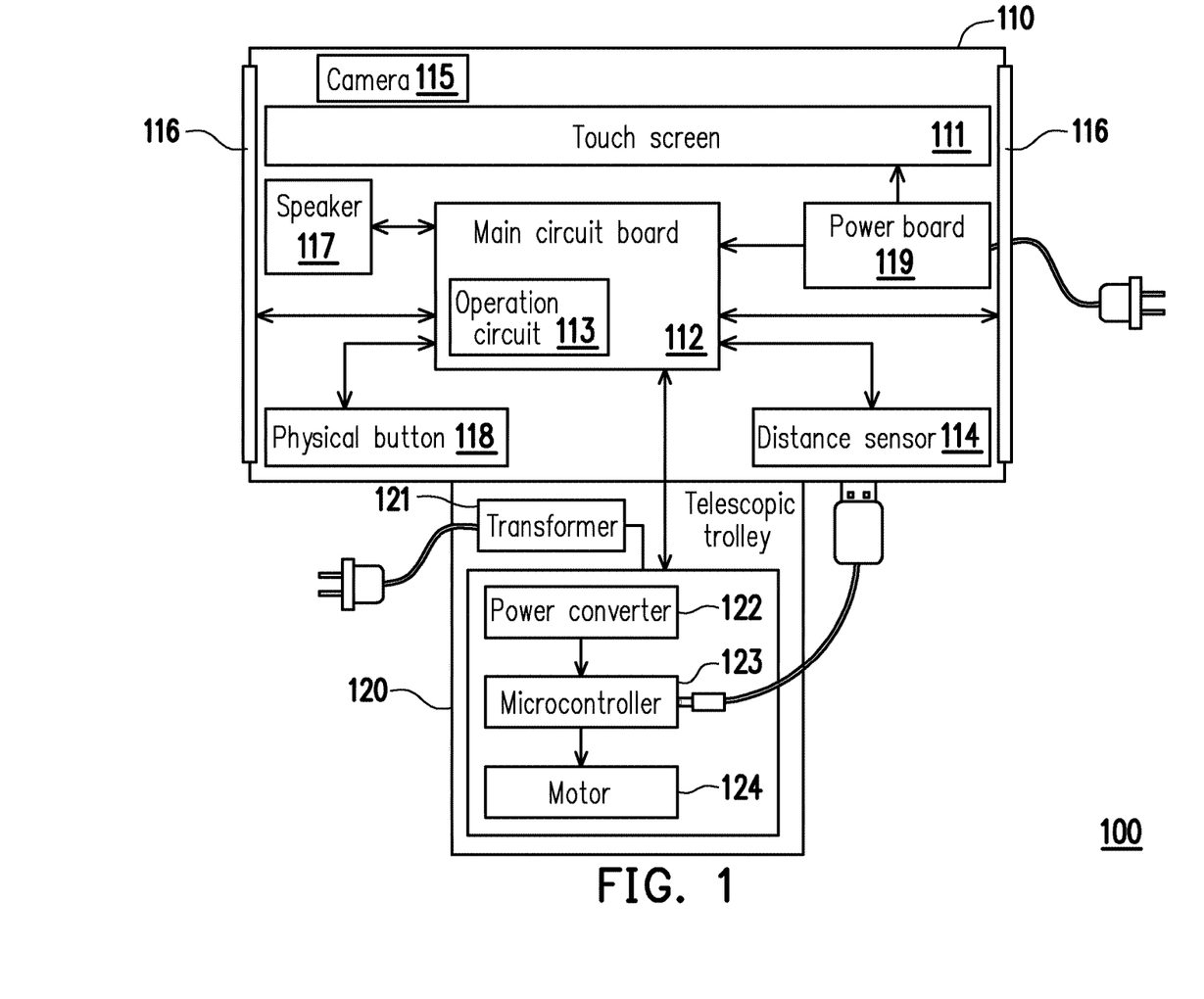
FIG. 1 is a schematic diagram of the structure of the display height adjusting device of the disclosure.
Figure 2A:
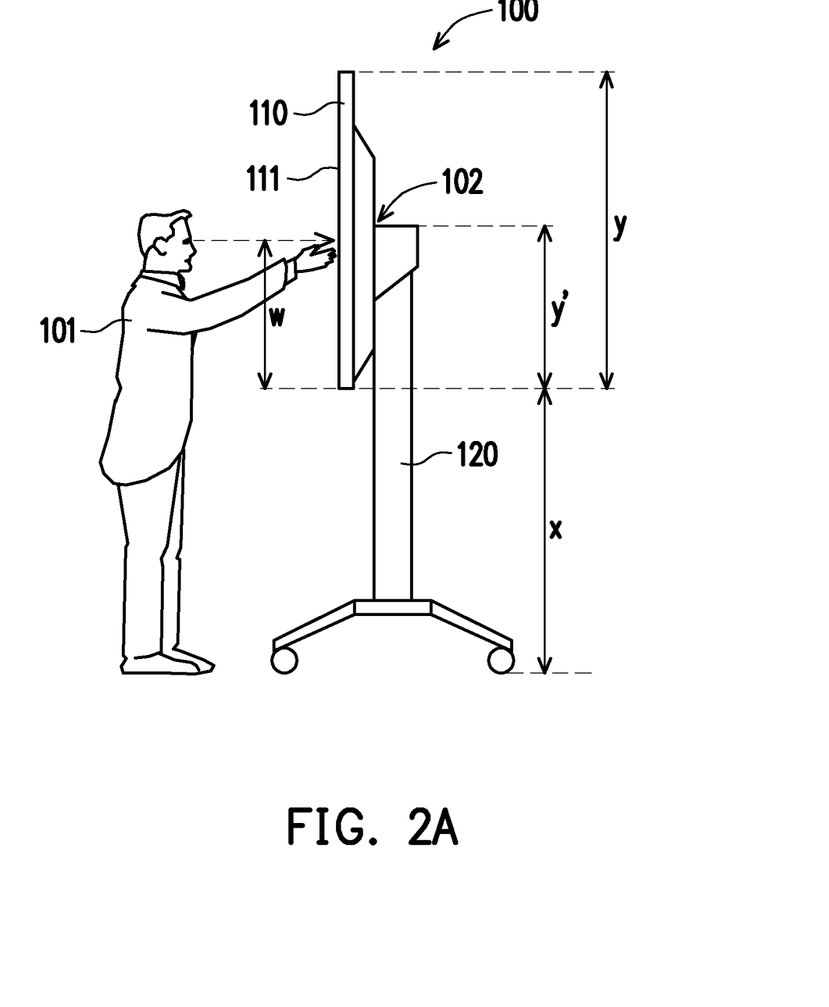
FIG. 2A is a schematic diagram showing an application scenario of the display height adjusting device of the disclosure.

FIG. 1 is a schematic diagram of the structure of the display height adjusting device of the disclosure. FIG. 2A is a schematic diagram showing an application scenario of the display height adjusting device of the disclosure. Please refer to FIG. 1 and FIG. 2A both. The display height adjusting device 100 includes a display 110 and a telescopic trolley 120. The display 110 can be supported by the telescopic trolley 120 to be elevated above the ground. One end of the telescopic trolley 120 is joined to the first surface of the display 110 and is separated from the lower edge of the display 110 by a first distance. Specifically, the telescopic trolley 120 is integrated on the rear surface of the display 110, that is, the other side of the touch area relative to the display 110 (i.e., the touch screen 111). In addition, the lower edge of the display 110 is separated from the top of the telescopic trolley 120 by a first distance y'. The first distance y' is the result of multiplying the height y of the display 110 by a coefficient. The coefficient is fixed after the display 110 is arranged on the telescopic trolley 120. The coefficient represents the ratio of the distance between the position 102 where the display 110 is joined with the telescopic trolley 120 and the lower edge of the display 110 to the height y of the display 110. In this embodiment, the ratio may be 0.33. In other embodiments, the ratio may be 0.5, 0.75 or other values.

The display height adjusting device 100 mainly includes a distance sensor 114, an operation circuit 113, a motor 124, and a microcontroller 123. In addition to the operation circuit 113 and the distance sensor 114, the display 110 may further include a touch screen 111, a main circuit board 112 provided with an operation circuit 113, a camera 115, a pressure sensor 116, a speaker 117, a physical button 118, and a power board 119. Other than the microcontroller 123, the telescopic trolley 120 may further include a transformer 121 and a power converter 122. Specifically, the functions of the touch screen 111, the main circuit board 112, the camera 115, the speaker 117, the physical buttons 118, the power board 119, the transformer 121, and the power converter 122 are commonly known to those with ordinary knowledge in the field to which the disclosure belongs, so no further details are incorporated herein.

The distance sensor 114 is arranged on the lower edge of the display to detect the distance between the display and the ground to obtain the second distance x. The distance sensor 114 may be a laser rangefinder, a triangulation 3D laser scanner, an ultrasonic sensor, an infrared sensor, an altimeter, or other types of distance sensors. However, it should be noted that setting the distance sensor 114 is not the only means for the operation circuit 113 to obtain the second distance x. In an embodiment, the user 101 can check the height scale on the telescopic trolley 120 and manually input the second distance x.

The operation circuit 113 is configured to receive a first height value indicating the height or eye height of the user 101, and search for the second height value corresponding to the first height value in a pre-established look-up table according to the first height value. The second height value represents the recommended height of the telescopic trolley 120 based on the eye height (or height) of the user 101. In this embodiment, the second height value may be the sum of the recommended first distance y' and the second distance x. The look-up table is shown in Table (1), and records a plurality of first height values and a plurality of corresponding second height values.

TABLE 1

| The first height value (cm) | The second height value (cm) |
|---|---|
| 154 | 170 |
| 162 | 175 |
| 175 | 182 |
| 190 | 195 |

There are many ways to obtain the first height value. In an embodiment, the user 101 can be guided to manually input his/her height through the guidance of the display content on the touch screen 111. In an embodiment, the display content (such as displaying a level) on the touch screen 111 can be used to guide the user 101 to gaze and touch the gaze point (as shown in FIG. 2A) to generate a touch point. The distance between the touch point and the lower edge of the touch screen 111 can be calculated based on the coordinate of the touch point to obtain the distance w. The operation circuit 113 can add up the second distance x and the distance w to obtain a first height value equivalent to the eye height of the user 101.

Figure 2B:
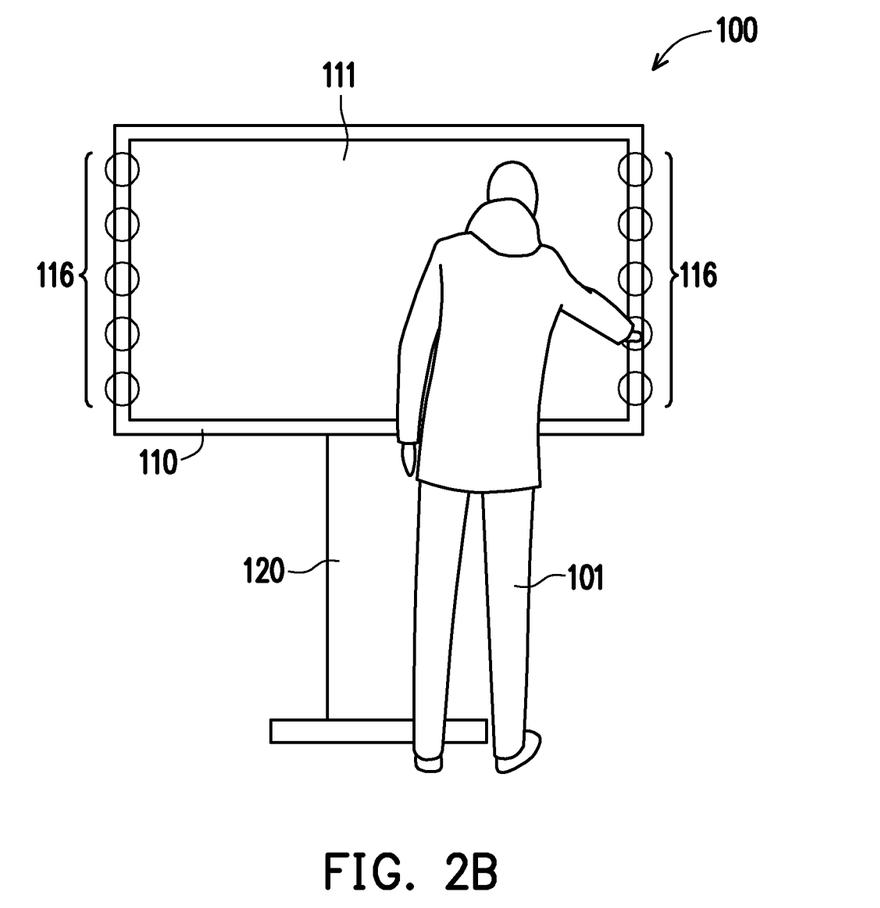
FIG. 2B is a schematic diagram showing an application scenario of the display height adjusting device of the disclosure.

FIG. 2B is a schematic diagram showing an application scenario of the display height adjusting device of the disclosure. Please refer to FIG. 2B. In an embodiment, the user 101 can be guided to touch the pressure sensors 116 on both sides of the touch screen 111 through the guidance of the display content on the touch screen 111. In this embodiment, the pressure sensor 116 may be a pressure sensing strip (resistive or capacitive). In an embodiment, the user may also press and touch the buttons on both sides of the touch screen 111 to obtain the first height value. In this way, the operation circuit 113 can obtain the first height value through the pressure sensing result.

Figure 2C:
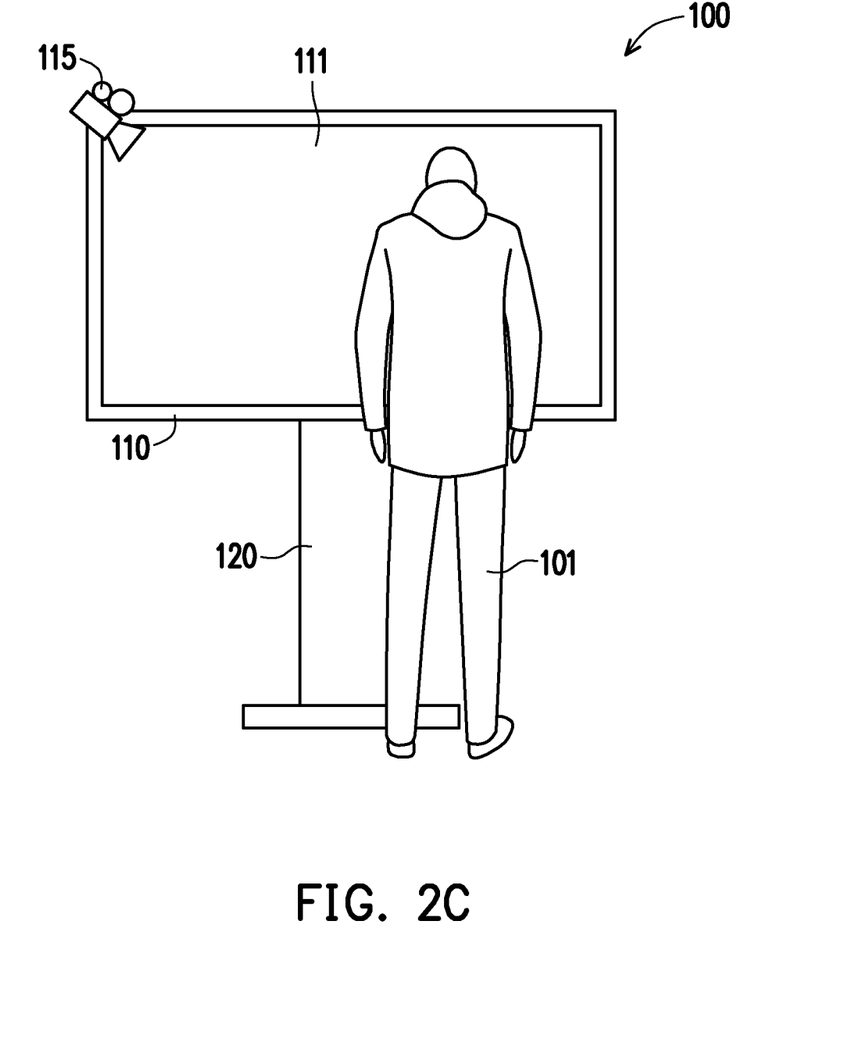
FIG. 2C is a schematic diagram showing an application scenario of the display height adjusting device of the disclosure.

FIG. 2C is a schematic diagram showing an application scenario of the display height adjusting device of the disclosure. Please refer to FIG. 2C. In an embodiment, the user 101 can be guided to move to a specific position (for example, 1 meter right in front of the touch screen 111) and stand (sit) straight through the guidance of the display content on the touch screen 111. The camera 115 is set to capture images in the manner of facing the specific position to obtain an image of the user. The operation circuit 113 can capture the distance between the coordinate corresponding to the user's eyes (or the highest point of the figure's contour) in the image and the ground coordinate through image analysis, thereby obtaining the first height value indicating the eye height (or height) of the user 101.

It should be noted that, in addition to obtaining the first height value equivalent to the eye height of the user 101, a similar method can also be adopted to obtain a height equivalent to the head height or shoulder height of the user 101. For example, in an embodiment, the display content of the touch screen 111 can be used to guide the user 101 to raise the arm so that the arm is level with the shoulder, and touch the touch screen 111 with a finger. In this way, the distance w from the touch point on the screen to the lower edge of the touch screen 111 can be obtained. The operation circuit 113 may add up the second distance x and the distance w to obtain a first height value equivalent to the shoulder height of the user 101.

In addition, the meaning of the first height value recorded in the look-up table needs to correspond to the guidance display content on the touch screen 111. For example, if the first height value recorded in the look-up table indicates the eye height, the first height value obtained through the above method is substantially the height of the user's eyes.

The operation circuit 113 is further adopted to calculate the sum of the first distance y' and the second distance x, and calculate the difference between the sum and the second height value to obtain the comparison result. The microcontroller 123 is coupled to the motor 124, and receives the comparison result through a network interface or a data transmission interface. The microcontroller 123 is configured to generate a control signal according to the comparison result. The motor 124 is driven according to the control signal to adjust the length of the telescopic trolley 120.

Figure 3:
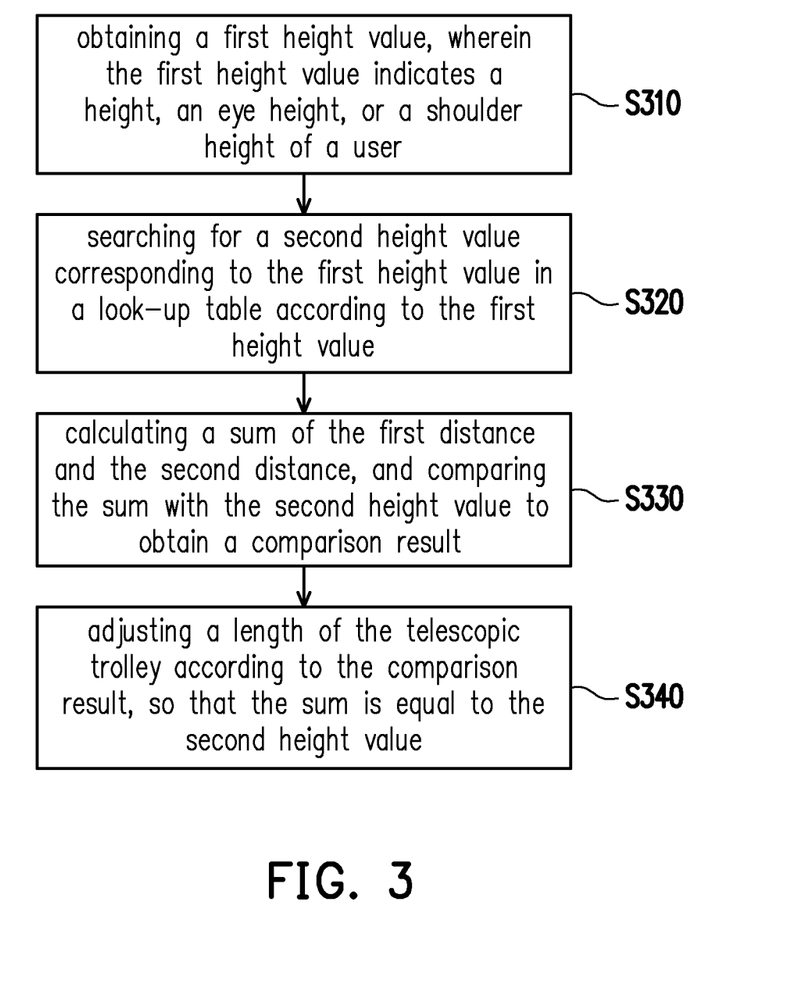
FIG. 3 is a flowchart showing the steps of the method for adjusting display height according to the disclosure.

FIG. 3 is a flowchart showing the steps of the method for adjusting display height according to the disclosure, which is applicable for a display supported by a telescopic trolley. One end of the telescopic trolley is joined to the first surface of the display and is separated from the lower edge of the display by a first distance. The lower edge of the display is away from the ground by a second distance. Please refer to FIG. 2 and FIG. 3 both. First of all, the first height value is obtained (step S310). The first height value is adopted to indicate a height, an eye height, or a shoulder height of the user. A second height value corresponding to the first height value is searched in the look-up table according to the first height value (step S320), and the second height value represents the operating height for the screen recommended by the system. The sum of the first distance y' and the second distance x is calculated, and the difference between the sum and the second height value is calculated to obtain a comparison result (step S330). Finally, the length of the telescopic trolley 120 is adjusted according to the comparison result, so that the sum is equal to the second height value (step S340).

Figure 4:
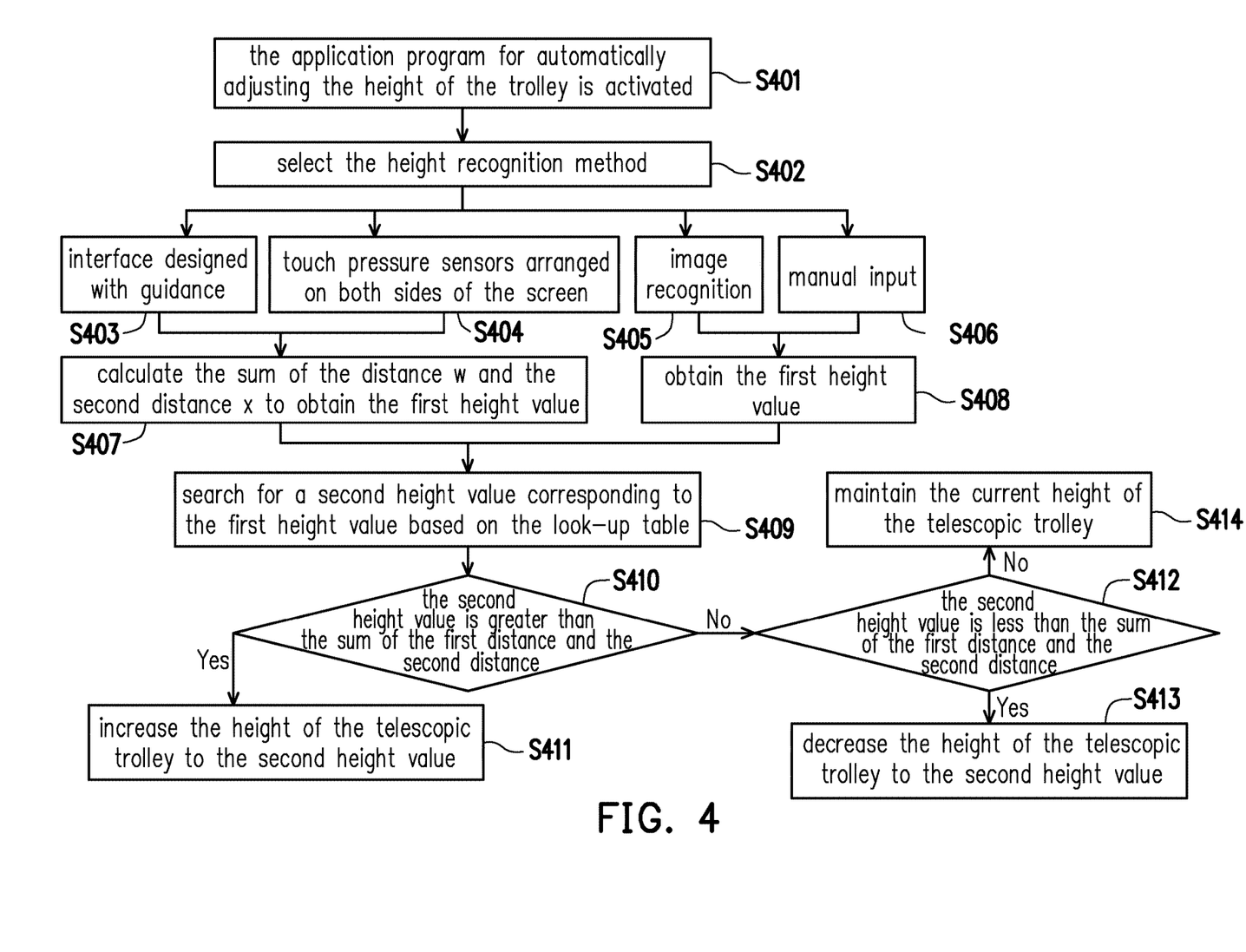
FIG. 4 is a flowchart showing the steps of the method for adjusting display height according to an embodiment of the disclosure.

FIG. 4 is a flowchart showing the steps of the method for adjusting display height according to an embodiment of the disclosure. Please refer to FIG. 2 and FIG. 4 both. In step S401, the application program for automatically adjusting the height of the trolley is activated. In an application scenario, the user 101 can click on a specific icon in the display content of the display 110 to activate an application program that automatically adjusts the height of the trolley. The application program for automatically adjusting the height of the trolley is pre-installed in the operating system of the display 110. In step S402, the user 101 can select the height recognition method by touching the screen with the guidance of the displayed content. The display content can provide one or more height recognition methods, such as interface designed with guidance, touch pressure sensors arranged on both sides of the screen, image recognition, or manual input. The user can choose one of the methods to enable the operation circuit to obtain the first height corresponding to the user's height, eye height, or shoulder height (steps S403 to S406).

By performing steps S403 and S404, the distance between the touch point and the lower edge of the screen, that is, the distance w, can be obtained. Next, the operation circuit calculates the sum of the distance w and the second distance x to obtain the first height value (step S407). The first height value corresponding to the height of the user can be directly obtained by performing steps S405 and S406 (step S408). In step S409, the operation circuit searches for a second height value corresponding to the first height value based on the look-up table. The operation circuit compares the sum of the first distance and the second distance with the second height value. One end of the telescopic trolley 120 is joined to the first surface of the display 110 and is separated from the lower edge of the display 110 by the first distance, and the lower edge of the display 110 is away from the ground by a second distance. When the second height value is greater than the sum of the first distance and the second distance (step S410), the operation circuit controls the motor to drive the motor to increase the height of the telescopic trolley 120 (that is, the sum of the first distance and the second distance) to the second height value (step S411). When the second height value is not greater than the sum of the first distance and the second distance, it is further determined whether the second height value is less than the sum of the first distance and the second distance (step S412). If the determining result is yes, the operation circuit controls the motor to lower the height of the telescopic trolley 120 (that is, the sum of the first distance and the second distance) to the second height value (step S413). If the determining result is no, no adjustment is performed so that the telescopic trolley 120 maintains the current height (step S414).

Regarding steps S410 and S412, in actual implementation, the operation circuit may calculate the difference between the second height value and the sum of the first distance and the second distance. If the difference is less than a threshold (for example, 1 cm, 3 cm, or other values), the current height of the telescopic trolley is maintained. If the difference is greater than the threshold, the height of the telescopic trolley is increased or decreased according to whether the difference is greater than or less than 0.

In the form of hardware, the blocks of the operation circuit can be implemented in a logic circuit on an integrated circuit. Related functions of the operation circuit may be implemented as hardware by using hardware description languages (such as Verilog HDL or VHDL) or other suitable programming languages. For example, the related functions of the operation circuit can be implemented in one or more controllers, microcontrollers, microprocessors, application-specific integrated circuits (ASICs), digital signal processors (DSP), field programmable gate array (FPGA) and/or various logic blocks, modules and circuits in other processing units.

In the form of software and/or firmware, the related functions of the operation circuit can be implemented as programming codes. For example, the operation circuit can be implemented by using general programming languages (such as C, C++, or assemble languages) or other suitable programming languages. The programming code may be recorded/stored in a recording medium, which includes, for example, a read only memory (ROM), a storage device, and/or a random access memory (RAM). A computer, a central processing unit (CPU), a controller, a microcontroller, or a microprocessor can read and execute the programming code in the recording medium, so as to achieve related functions. As the recording medium, a "non-transitory computer readable medium" can be adopted, such as a tape, a disk, a card, a semiconductor memory, and a programmable logic circuit, etc. Furthermore, the program can also be provided to the computer (or CPU) via any transmission medium (communication network, broadcast wave, etc.). The communication network is, for example, the Internet, wired communication, wireless communication, or other communication media.

In summary, the disclosure can automatically adjust the height of the telescopic trolley according to the first height value (user height, eye height or shoulder height). In this way, all kinds of users can quickly and accurately adjust the display to a suitable height, avoiding the inconvenience caused by repeated adjustments, and reducing the discomfort caused by the display height being too high or too low, thereby providing users with a good user experience.

What is claimed is:

1. A method for adjusting a display height, which is applicable for a display supported by a telescopic trolley, wherein one end of the telescopic trolley is joined to a first surface of the display and is separated from a lower edge of the display by a first distance, and the lower edge of the display is away from a ground by a second distance, the method for adjusting the display height comprises:

obtaining a first height value, wherein the first height value indicates a height, an eye height, or a shoulder height of a user;

searching for a second height value corresponding to the first height value in a look-up table according to the first height value;

calculating a sum of the first distance and the second distance, and comparing the sum with the second height value to obtain a comparison result; and adjusting a length of the telescopic trolley according to the comparison result, so that the sum is equal to the second height value.

2. The method for adjusting the display height according to claim 1, wherein the step of adjusting the length of the telescopic trolley according to the comparison result further comprises:

when the comparison result indicates that the sum is less than the second height value, controlling the length of the telescopic trolley to increase;

when the comparison result indicates that the sum is greater than the second height value, controlling the length of the telescopic trolley to decrease; and when the comparison result indicates that the sum is equal to the second height value, making the telescopic trolley to maintain at a current length.

3. The method for adjusting the display height according to claim 1, further comprising:

detecting a distance from the lower edge of the display to the ground to obtain the second distance.

4. The method for adjusting the display height according to claim 1, wherein the first height value is obtained by the user touching a touch area on a second surface of the display relative to the first surface.

5. The method for adjusting the display height according to claim 1, wherein a plurality of buttons are arranged on an edge of the display, and the first height value is obtained by pressing one of the plurality of buttons by the user.

6. The method for adjusting the display height according to claim 1, wherein an edge of the display is provided with a pressure sensing strip, and the first height value is obtained by pressing the pressure sensing strip by the user.

7. The method for adjusting the display height according to claim 1, wherein a camera is provided on one side of the display, and the step of obtaining the first height value further comprises:

displaying a picture on the display to guide the user to move to a spot;

capturing, by the camera, in a manner of facing the spot to obtain an image; and performing an image analysis on the image to obtain the first height value.

8. The method for adjusting the display height according to claim 7, wherein the step of performing the image analysis on the image to obtain the first height value further comprises:

recognizing a contour of the user in the image to obtain the first height value according to a coordinate position corresponding to a highest point of the contour.

9. The method for adjusting the display height according to claim 7, wherein the step of performing the image analysis on the image to obtain the first height value further comprises:

recognizing the user' eyes in the image to obtain the first height value according to a coordinate position corresponding to a position of the eyes.

10. The method for adjusting the display height according to claim 1, wherein the telescopic trolley comprises a motor and a microcontroller coupled to the motor, and the method for adjusting the display height further comprises:

driving the motor by the microcontroller to adjust a length of the telescopic trolley according to the comparison result.

11. A display height adjusting device, wherein a display is supported by a telescopic trolley, one end of the telescopic trolley is joined to a first surface of the display and is separated from a lower edge of the display by a first distance, and the lower edge of the display is away from a ground by a second distance, and the display height adjusting device comprises:

an operation circuit, configured to:
receive a first height value indicating a height, an eye height or a shoulder height of a user;
search for a second height value corresponding to the first height value in a look-up table according to the first height value; and
calculate a sum of the first distance and the second distance, and compare the sum with the second height value to obtain a comparison result;

a motor, coupled to the telescopic trolley for adjusting a length of the telescopic trolley according to a control signal, so that the sum is equal to the second height value; and a microcontroller, coupled to the motor to generate the control signal according to the comparison result.

12. The display height adjusting device according to claim 11, wherein the operation circuit is further configured to:

when the comparison result indicates that the sum is less than the second height value, increasing the length of the telescopic trolley by controlling the microcontroller and the motor;

when the comparison result indicates that the sum is greater than the second height value, reducing the length of the telescopic trolley by controlling the microcontroller and the motor; and when the comparison result indicates that the sum is equal to the second height value, making the telescopic trolley to maintain a current height.

13. The display height adjusting device according to claim 11, further comprising a distance sensor arranged on the lower edge of the display, wherein the distance sensor is configured to detect a distance from the lower edge of the display to the ground to obtain the second distance.

14. The display height adjusting device according to claim 11, wherein the display comprises a touch area disposed on a second surface of the display relative to the first surface, and the first height value is obtained by touching the touch area by the user.

15. The display height adjusting device according to claim 11, wherein a plurality of buttons are arranged on an edge of the display, and the first height value is obtained by pressing one of the plurality of buttons by the user.

16. The display height adjusting device according to claim 11, wherein an edge of the display is provided with a pressure sensing strip, and the first height value is obtained by pressing the pressure sensing strip by the user.

17. The display height adjusting device according to claim 11, further comprising:

a camera, provided on one side of the display, wherein the camera is configured to, when the user moves to a spot with guidance of a picture displayed by the display, capture and obtain an image in a manner of facing the spot, wherein the operation circuit is further configured to perform an image analysis on the image to obtain the first height value.

18. The display height adjusting device according to claim 17, wherein the operation circuit is further configured to:

recognize a contour of the user in the image to obtain the first height value according to a coordinate position corresponding to a highest point of the contour.

* * * * *